United States Patent [19]
Mills et al.

[11] Patent Number: 5,954,611
[45] Date of Patent: Sep. 21, 1999

[54] PLANETARY BELT TRANSMISSION AND DRIVE

[75] Inventors: Dennis Mills, Chaska; Johannes J. W. G. M. Huijbers, Eden Prairie, both of Minn.

[73] Assignee: DaVinci Technology Corporation, Long Lake, Minn.

[21] Appl. No.: 08/868,887

[22] Filed: Jun. 4, 1997

[51] Int. Cl.$^6$ ....................................................... F16H 9/26
[52] U.S. Cl. ............................................................. 475/182
[58] Field of Search ............................. 475/182; 474/139, 474/149

[56] References Cited

U.S. PATENT DOCUMENTS

| | | | |
|---|---|---|---|
| 142,365 | 9/1873 | Armstrong | 475/182 |
| 555,684 | 3/1896 | Dubreuil | 475/182 |
| 1,324,945 | 12/1919 | Weriane . | |
| 1,670,144 | 4/1928 | Ewart | 475/182 |
| 2,197,014 | 4/1940 | Stenzy | 475/182 |
| 2,852,854 | 9/1958 | Hobbs | 475/182 |
| 2,941,421 | 6/1960 | Plotti | 475/182 |
| 3,691,871 | 9/1972 | Gladow et al. | 475/182 |
| 3,842,685 | 10/1974 | Philpott et al. | 74/217 |
| 5,462,363 | 10/1995 | Brinkman | 384/91 |

FOREIGN PATENT DOCUMENTS

| | | |
|---|---|---|
| 8309940 | 12/1984 | France . |
| 3719006 | 12/1988 | Germany .......................... F16H 1/28 |
| 3918348 | 12/1990 | Germany . |
| 62-288765 | 12/1987 | Japan . |

*Primary Examiner*—Dirk Wright
*Attorney, Agent, or Firm*—Schwegman, Lundberg, Woessner, and Kluth, P.A.

[57] ABSTRACT

A transmission includes a ring member, a sun member, a number of planetary sheaves and a serpentine drive member which wraps around the sun member, and the planetary sheaves. The planetary sheaves are attached to a planet carrier at a distance from the sun member. When the serpentine drive member is wrapped around the sun member and the planetary sheaves, the serpentine drive member forms a C-shape. The transmission can be used in a device that has an input shaft that must be rotated at a first speed and an output shaft that must be rotated at a second speed. The transmission can even be used as a reverser. The serpentine drive member can be any type of drive member, including a timing belt with teeth, a flat belt, a cable chain, or a link chain.

4 Claims, 14 Drawing Sheets

5,954,611

PLANETARY BELT TRANSMISSION AND DRIVE

FEILD OF THE INVENTION

The present invention relates to a transmission apparatus. More particularly, the invention relates to a planetary type transmission system that includes a roller cable, chain or belt type.

BACKGROUND OF THE INVENTION

Power transmissions are used to change the rotational speed of drivers to a selected speed suitable for the driven load. There are many types of transmissions. Two main categories in power transmissions are gear type and belt type transmissions. Gear type power transmissions include, for example, parallel shaft gear boxes, worm gear reductions and planetary gear drives. Belt type power transmissions include flat belt, V-belt, V-ribbed belt, and timing belt, and cable chain transmissions.

When transmission devices employ gears to provide an increased or reduced rate of rotation of an output shaft in relation to the rate of rotation of an input shaft, the gears ensure that slippage does not occur between the input and output shafts. Such slippage may occur in certain belt type transmissions.

Gear transmissions have the advantage of high horsepower ratings, high efficiency (with exception of the wonn gear reductions) and relatively small size. Even though gear transmissions have certain advantages, gear transmissions also have limitations. Among the limitations associated with gear transmissions, are that the teeth of the gears and the bearing and shaft configuration must be machined accurately in order to minimize frictional resistance and to provide an accurate angular relationship between the input and output shafts. As a result, gear transmissions are relatively expensive when compared to an equivalent belt type transmission.

Another type of gear transmission is called a planetary gear transmission or drive. A planetary gear system includes a sun gear, multiple planet gears and a ring gear. The sun gear includes gear teeth on its outer surface. The ring gear includes gear teeth on its inner diameter. Usually three or more planet gears mesh with the gear teeth on the sun and on the inner diameter of the ring gear. The planet gears are positioned between the sun gear and the ring gear. In operation, the planet gears orbit around the sun when the ring gear is fixed.

The planetary gear drive has all the advantages of gear type transmissions plus the additional advantage of having the driving shaft and the driven shaft in one line (collinear input/output shafts). One limit on planetary gear systems relates to possible transmission ratios. The upper limit on the gear ratio of the planetary gear system is about 6:1. The upper limit on planetary gear systems gear ratio is actually a physical limitation. In order to operate smoothly, the planet gears must be able to mesh with both the ring gear and the sun gear. The transmission ratio of a planetary gear transmission is equal to twice the sum of the planet radius and the sun radius divided by the sun radius. The diameter of the ring is equal to the sum of the sun diameter and twice the planet diameter. The physical limitation of fitting three or more planet gears in a ring gear without interference between the planets or mesh interference between a planet gear and ring gear limits the maximum radius of a single stage planetary gear transmission to about 6:1.

Gears operate under a diversity of conditions, and the methods of lubrication will vary accordingly. For unenclosed or exposed gearing, the lubricant is applied by an oilcan, a drip oiler, or a brush for open gears. Frequent applications of small amounts of lubricant are preferable to large volumes at longer intervals. If the gears are exposed to water or acids, a sticky lubricant that will adhere to the metal must be used.

When gears run in an enclosed casing, the larger gears may dip into a bath or oil, which will be carried to the wearing surfaces and run down into the bearings, the orientations of transmissions of this type is critical since an oil pan must be positioned for gravity feed of the lubricant. Sometimes enclosed gearing is lubricated by spraying a jet of oil on the working surfaces as they revolve toward each other. This type of lubrication requires a hydraulic pump added to the transmission design. When the contact pressure is very high, extreme-pressure EP lubricants must be used to prevent rupture of the oil film and the resulting metal-to-metal contact of the parts. Lubricants of the EP type contain additives that increase the load-carrying properties as well as prevent the squeezing out of the lubricant. Of course, foreign matter in the lubricant can cause a rapid increase in the rate of wear of the teeth whether the gear transmission is enclosed or unenclosed.

The alignment of gears is very important. Care must be exercised that shafts are parallel and within tight tolerances or the entire load will be carried at the sides of the teeth instead of across the entire width of face. Excessive wear and danger of failure result if gears are improperly mounted and aligned. The same effect occurs if the teeth are not cut parallel to the axis of rotation or may have other inaccuracies. Elastic deformation of the teeth, blanks, shafts, and bearing supports can also be the cause of misalignment. Unbalanced rotating masses in a geared system can also cause unexpected loading which the teeth are called upon to carry. Noise, vibration and shortened life can result from many causes, which may be difficult to locate and analyze.

Backlash is another limitation associated with gear transmissions. Backlash is the amount by which the width of a tooth space exceeds the thickness of the engaging tooth measured on the pitch circle. Backlash does not adversely affect proper gear function except for lost motion upon reversal of gear rotation. In a planetary gear transmission as well as other gear transmissions this lost motion is amplified by the number of gears which must be reversed. In many applications, backlash is not a problem. Other gear transmission applications will not tolerate backlash. For example, gear transmissions used in X-Y plotters or used in software controlled milling machines must be capable of moving in forward and reverse with little to no backlash so that machining or drawings can be made accurately. Forming gear transmissions with little backlash requires closer tolerances or more exacting placement and adjustment of the individual gears during assembly of the gear transmission. This adds to the cost of a gear transmission. To have zero backlash, a gear transmission requires a double gear set that is spring-loaded to take up the play. This added mechanism also adds to the cost of a gear transmission.

The major disadvantages of gear transmissions are relatively high cost, their need for accurate tolerances of the gears, shafts and bearings, their sensitivity to misalignment (axial and angular misalignment), the existence of backlash, and their need for lubrication and maintenance. An exception is small plastic gears with a relatively low power rating do not need lubrication. Splash or bath-lubricated gears are limited with respect to possible mounting angles of the transmission. Elimination or lessening the effects of backlash requires a gear transmission with a double gear set that is spring-loaded to take up the play.

Belt transmissions have the advantage of being less expensive than equivalent gear drives in that alignment of the various components is not as critical, and machining and assembly does not have to be as precise. A belt transmission is typically quieter than a gear transmission and typically has similar efficiencies. Belt transmissions require no lubrication other than possibly the bearings and this can be eliminated by using maintenance-free bearings such as sealed ball bearings or bushings. Furthermore, belt transmissions have a very smooth operation, do not require the accurate manufacturing tolerances of a gear transmission and are more forgiving in terms of alignment. The major disadvantages of belt drives are the occurrence of slip between the belt and the pulleys (this is not the case for timing or synchronous belts). Furthermore, since current one stage belt transmissions do not have the input shaft and output shaft in one line, belt transmissions generally require more space than a planetary gear transmission.

As noted above, both gear transmissions and belt transmissions have disadvantages. There is a need for a transmission that overcomes many of these disadvantages and which has most of the advantages of both the gear transmissions and the belt transmissions. There is a need for a transmission which has a high transmission ratio and which requires no lubrication and therefore no maintenance if maintenance-free bearings are used. There is also a need for an efficient transmission which is quiet, compact, and inexpensive to build and manufacture. There is also a need for a transmission that allows for mounting in any orientation and which is more forgiving in both angular alignment and axial alignment of the various components forming the transmission system. There is also a need for a transmission that is less expensive to build than a gear type transmission and, preferably a transmission that can be made with mostly off the shelf components. There is also need for a belt transmission that is capable of transmitting comparable amounts of power as a gear transmission without slippage. There is also a need for a transmission that is relatively light weight and small for the amount of horsepower that can be transmitted. There is a further need for a transmission that is smooth and table during its operation. There is further need for a transmission that has no backlash.

SUMMARY OF THE INVENTION

A planetary belt transmission includes a ring gear, a sun gear, a number of planetary sheaves and a belt which wraps around the sun gear, and the planet sheaves. The planet sheaves are attached to a planet carrier. The planet sheaves have no teeth. The ring gear and the sun gear have teeth in the embodiment of the planetary belt transmission which uses a toothed belt. In the embodiment using a toothed belt, the belt has a number of teeth which have a tooth profile which meshes with the teeth of the sun gear and the teeth of the ring gear. The flat part of the belt passes over the plurality of planet sheaves. When the belt is wrapped around the sun gear and the planetary sheaves, the belt generally forms a C-shape. The belt can also be thought of as generally forming a polygon with linear sides, with the exception of one side which has a U-shape. The bottom of the U wraps around the sun gear. The planetary belt transmission can be used in a device that has an input shaft that must be rotated at a first speed and an output shaft that must be rotated at a second speed. The rotary belt transmission can also be used to provide a reverse direction for the input shaft when the ring gear is held in a fixed position.

Another embodiment of the planetary belt transmission uses a roller chain rather than a toothed belt. In the roller chain embodiment, planet gears, ring gear, and the sun gear have sprocket teeth which mesh with the rollers of the chain. When the roller chain is wrapped around the sun gear and the planetary gears, the roller chain generally forms a C-shape. The roller chain can also be thought of as generally forming a polygon with linear sides, with the exception of one side which has a U-shape. The bottom of the "U" wraps around the sun gear. The roller chain can also be replaced with cable chains and mating chain sprockets.

The planetary belt transmission can also be formed with a flat belt that wraps around the sun member, the planet sheaves and the ring member. In this embodiment, the sun member, planet sheaves and ring member have no teeth. To prevent or minimize slippage, the planet sheaves are positioned close to the ring gear such that a force is placed onto the flat belt to by the planet sheaves to produce a large friction force between the planet sheaves, the ring gear and the belt passing therebetween. The amount of force placed on the belt can be adjusted to provide an appropriate amount of friction while minimizing wear.

The planetary belt transmission is very advantageous in that the planetary belt transmission is capable of higher transmission ratios than a planetary gear transmission. In the planetary belt transmission the diameters of the planets, sun and ring do not have the same relation as for a planetary gear transmission. The planets do not mesh with the sun or ring. It is the belt , that is the component, that transmits the power between sun and ring. As a result, higher gear ratios than a comparably sized planetary gear transmission are achievable.

The planetary belt transmission is also quiet, compact and inexpensive to build and manufacture. Mostly off -the-shelf and simple to build parts and maintenance-free bearings are used to keep the cost of the transmission less than a comparable planetary gear transmission. In addition, the planetary belt transmission requires no lubrication and little maintenance when maintenance-free bearings are used.

The planetary belt transmission is also forgiving in both angular and axial alignment of the various components, which also reduces the cost of building a planetary belt transmission system when compared to building or manufacturing a planetary gear transmission. The power transmitted is dependent upon the rating of the belt used in the planetary belt transmission. The sun gear can be changed in a planetary belt transmission to produce different output gear ratios between the sun gear and the ring gear. Idlers can be used to adjust the tension and accommodate different belt lengths in the planetary belt transmission. The end result is a transmission that has many of the benefits of a belt transmission plus many of the benefits of a planetary gear system. The planetary belt transmission and drive is a belt system capable of having an input shaft and an output shaft which are collinear, like the planetary gear transmission, so it requires less space than a conventional belt transmission.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
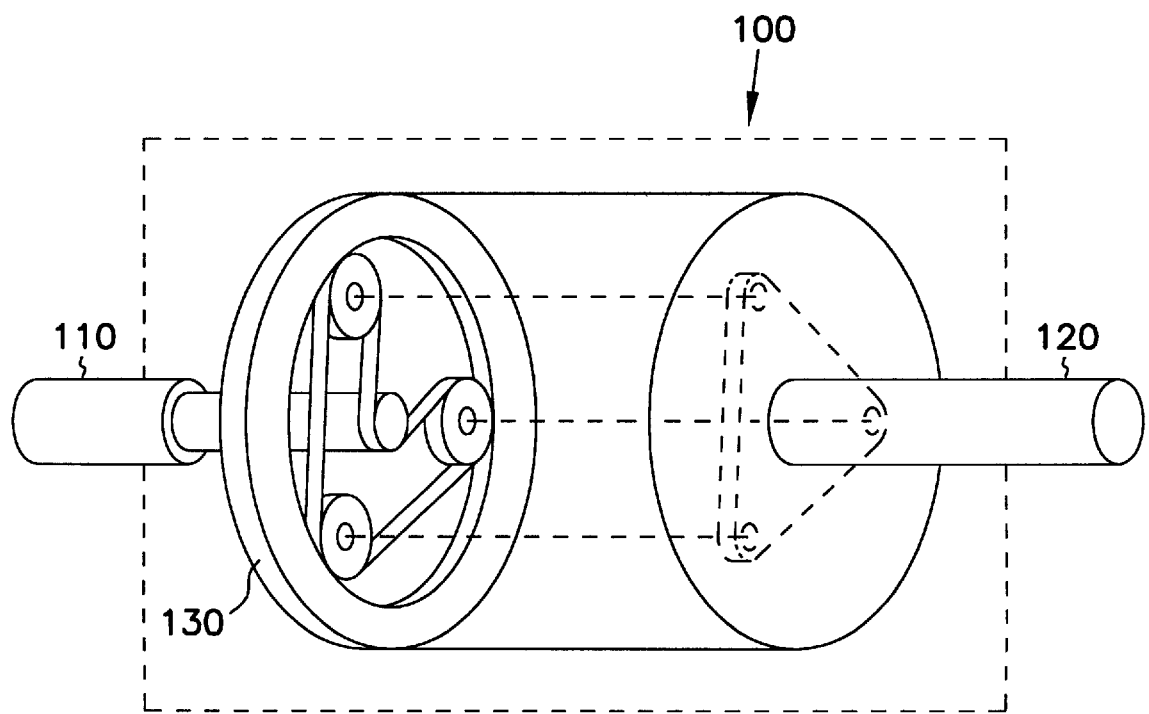
FIG. 1 is a schematic view of the transmission within a device.

FIG. 1 is a schematic view of a transmission within a device. The device 100 is shown as a phantom line box. Within the device 100 is a first shaft 110 and a second shaft 120. The first shaft 110 is the driving shaft. The second shaft 120 is the driven shaft. Transmission 130 is mechanically connected to the first shaft 110 and to the second shaft 120. The output or second shaft 120 rotates at a different speed than the first or driving shaft 110. Of course it should be noted that the second shaft 120, could also be the driving shaft and the first shaft 110, could be the driven shaft. Cars, lawnmowers, windshield wipers, x-y plotters, power equipment, garden rototillers, air compressors, hand or boat winches, farm equipment, paper drive for printers or copiers, car power seats, food processors and other kitchen devices, vacuum cleaners and outdoor power equipment are just a few of the devices 100 that require an input shaft driven at a first speed to be output at a different speed. The transmission 130 is also able to handle the transmission of the power from a driving shaft to a driven shaft.

Figure 2:
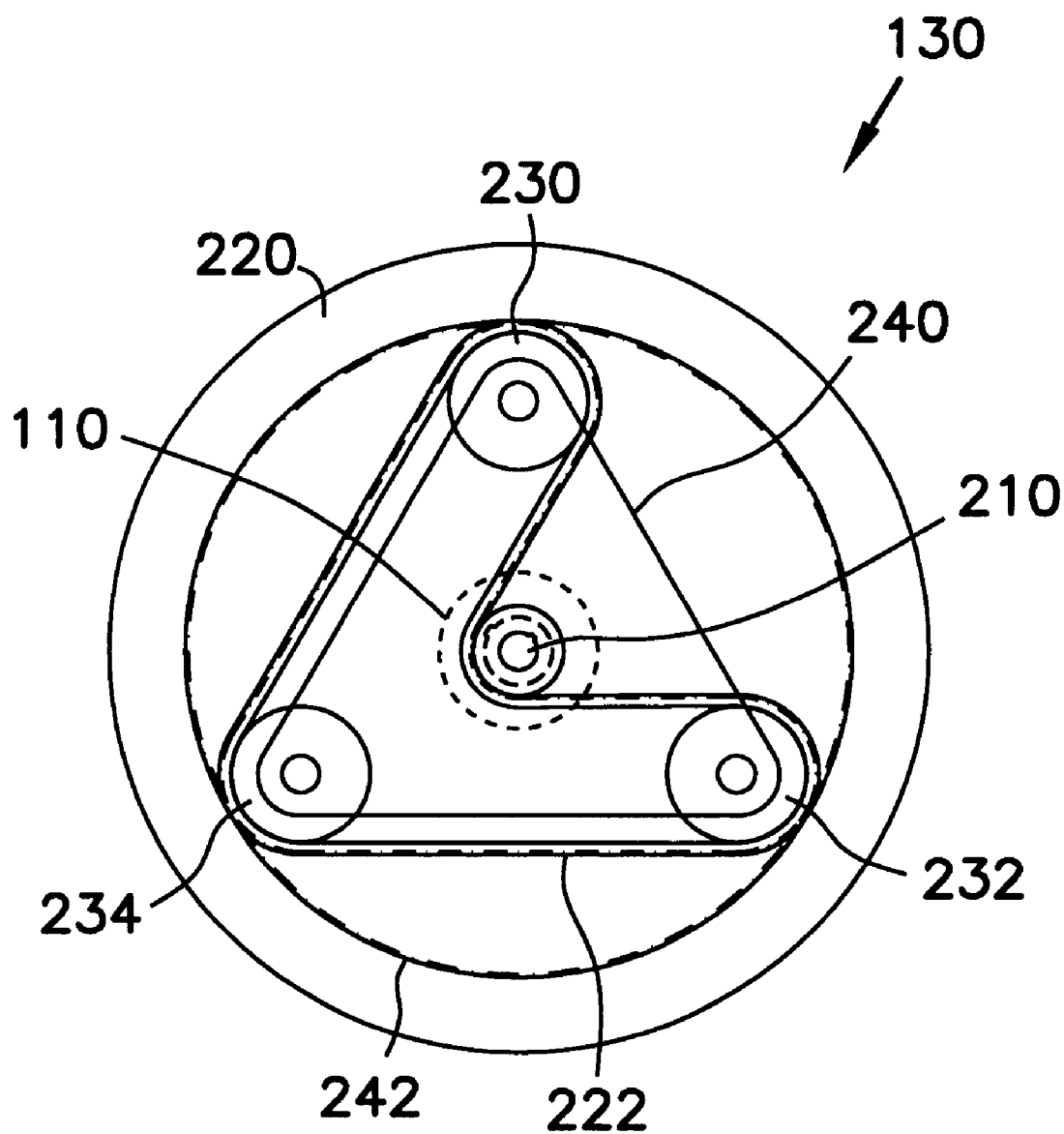
FIG. 2 is a cutaway front view of a preferred embodiment of a planetary belt transmission.

FIG. 2 shows a cutaway front view of a one preferred embodiment of a planetary belt transmission 130 with a carrier 240. The planetary belt transmission 130 includes a sun pulley 210, a ring pulley 220, three planetary sheaves 230, 232, 234, and a belt 222. The belt 222 has a plurality of teeth which are spaced along the belt 222. The teeth on the belt 222 can have several profiles which are shown and discussed FIGS. 3, 4, 5A and 5B. It should be noted that many different types of tooth profiles can be used in the planetary belt 222. The tooth profile used on the belt 222 determines the tooth profile used on the sun pulley 210 and the ring pulley 220. In other words, the teeth of the ring pulley 220 and the sun pulley 210 must mesh with the teeth on the belt 222. The tooth side of the belt, which is shown or depicted by a the pitch line 242 of the belt 222, is wrapped around the sun pulley so that the teeth of the belt 222 engage the teeth of the sun pulley 210 and is wrapped around the planetary sheaves 230, 232, 234 so that the teeth of the belt mesh with the teeth of the ring pulley 220. The teeth of the ring pulley 220 are depicted by the pitch circle 242 which is shown in dotted line along the inner diameter surface of the ring pulley 220. The belt 222 has a flat side which contacts the planetary sheaves 230, 232, and 234. The belt 222 forms a C-shape when wrapped around the sun pulley 210 and the planetary sheaves 230, 232 and 234. It should be noted that the line associated with the tooth side of the belt 222 is actually the pitch line 242 of the belt. The line associated with the inner diameter of the ring pulley 220, is also the pitch line of the ring pulley 220. The planet sheaves 230, 232 and 234 are held in position by a planet carrier. The planet carrier 240 is shown in this figure. The shaft attached to the planet carrier is not shown in this figure. The detail of the carrier 240 will be discussed in FIGS. 6, 7 and 8.

Figure 3:
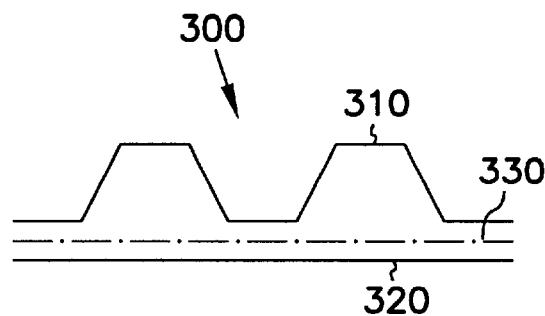
FIG. 3 is a side view of a first type of belt for use in the planetary belt transmission.
Figure 4:
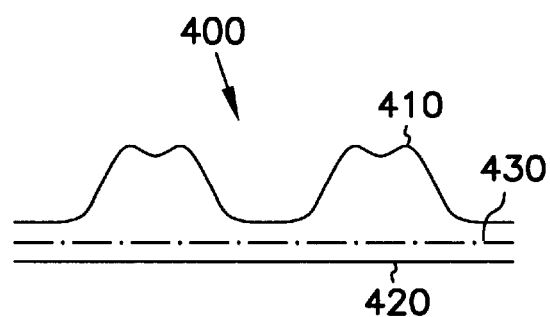
FIG. 4 is a side view of a second type of belt for use in the planetary belt transmission.

Now turning to FIG. 3, a side view of a first type of belt 300 shown. The belt has a tooth side 310 and a flat side 320. A pitch line 330 is shown for the belt 300. The belt, sun and ring roll along their pitch line respectively their pitch diameter. The belt 300 shows an standard type profile. FIG. 4 shows yet a third type of belt for use with the planetary belt transmission. Belt 400 has a toothed side 410 and a flat side 420. The belt has a pitch line 430. It should be noted that either of the belts 300 or 400 can be used with the corresponding pulleys in the planetary belt type transmission. The tooth profiles of the belts 310, and 410 are just two examples of the many types of profiles which will work for the planetary belt transmission. It should be understood that the belt profiles shown in the FIGS. 3 and 4 are not the only belts that can be used.

Figure 5A:
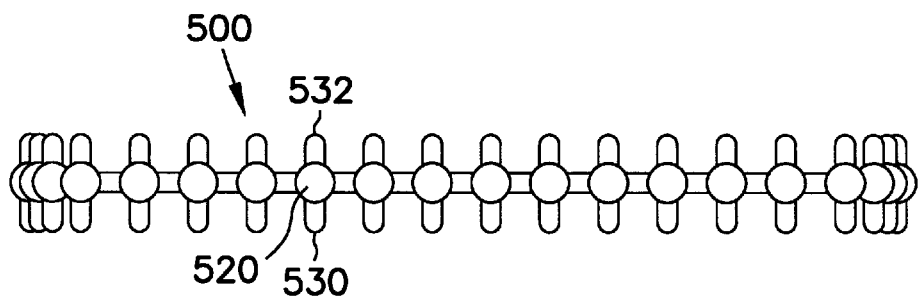
FIG. 5A is a top view of a cable chain for use in a planetary belt transmission.
Figure 5B:
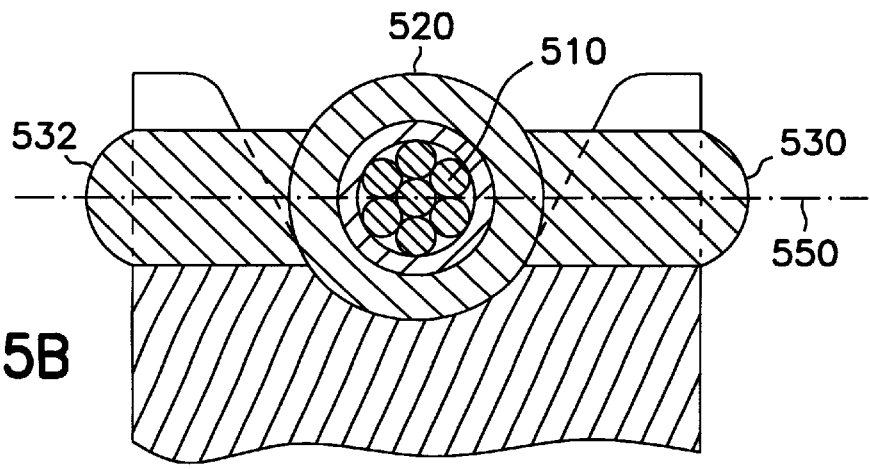
FIG. 5B is a section view of the cable chain for use in a planetary belt transmission.

FIGS. 5A and 5B illustrate another type of serpentine drive member that could be used in the planetary transmission. FIGS. 5A and 5B show a toothed belt drive that is available from W.M. Berg, Inc., 499 Ocean Avenue, East Rocaway N.Y. under the tradename "Flex-E-Belt". The particular belt 500 shown is a 24 pitch belt. The belt includes a cable or cable bundle 510 which is surrounded by a polyurethane cylinder or partial sphere 520. Attached to the polyurethane cylinder 520 and positioned substantially transverse to the cable or cable bundle 510 is a first cylindrical tab 530 and a second cylindrical tab 532. As shown in FIG. 5B, the cylindrical tabs 530 and 532 engage the teeth of the E-Z Entry Belt Sprocket Gear which is also available from the same manufacturer. It should be noted that many types of belts or drive belt like devices, such as the variety of belts, cable chains, link chains, and power tow chains available from W.M. Berg, Inc. and shown in their 1994 product catalog, could be used to engage the sun pulley 210 and the planet sheaves 230, 232, and 234 and the ring pulley 220. It should be noted that the term belt as used in this description includes all flexible driving devices such as belts, cable chains, link chains, and power tow chains. Of course, the planet sheaves 230, 232 and 234 may have to carry teeth or different types of teeth as part of this adaptation.

Figure 6:
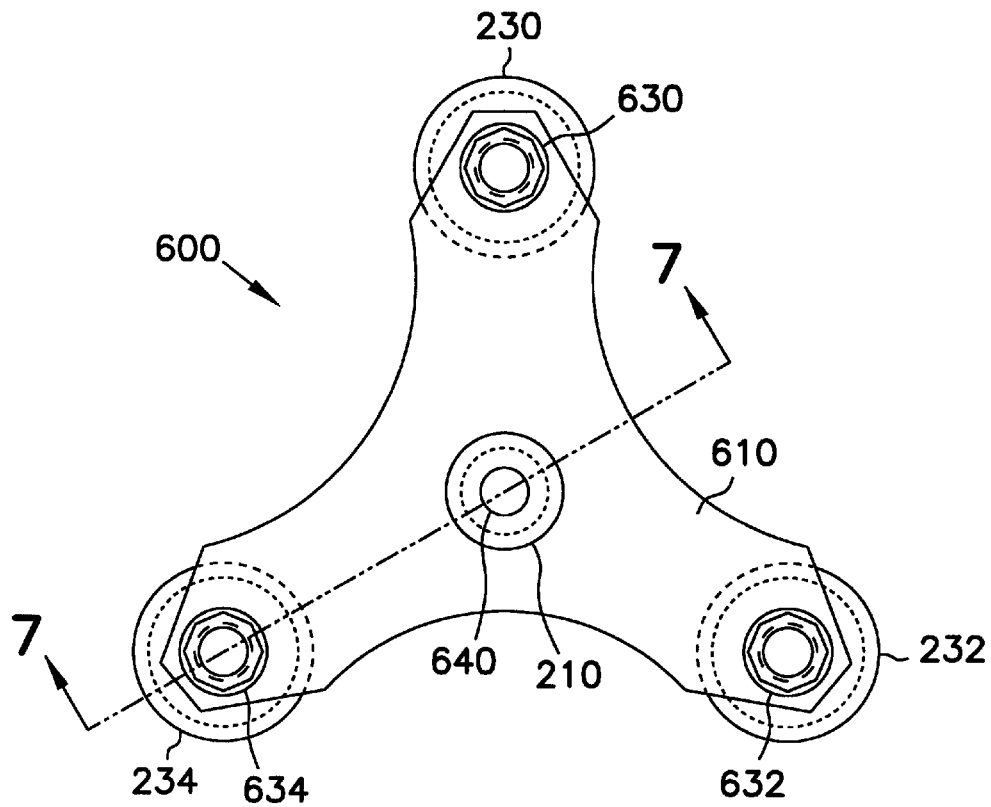
FIG. 6 is a top view of a planet carrier assembly of the planetary belt transmission.
Figure 7:
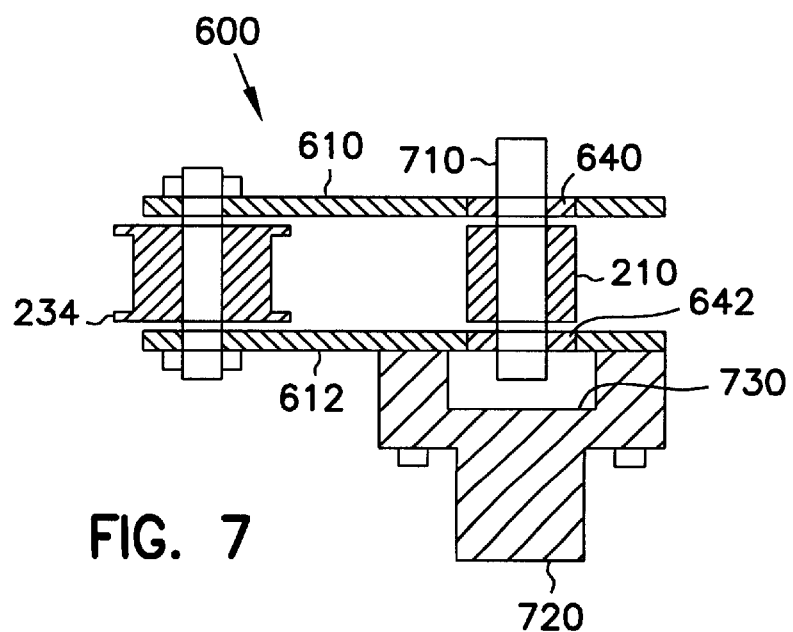
FIG. 7 is a side view of a planet carrier of the planetary belt transmission taken along line 7—7 of FIG. 6.

FIGS. 6 and 7 illustrate a planet carrier assembly 600. FIG. 6 is a top view of a planetary carrier 600 of the planetary belt transmission 130. In this figure the ring pulley and belt have been eliminated for the purpose of illustrating the carrier assembly 600. FIG. 7 is a side view of the planet carrier along line 7—7 of FIG. 6. The carrier assembly 600 is comprised of a pair of plates 610 and 612. The material selected for the planet carrier 600 plates 610 and 612 depends on the power requirements for the planetary gear transmission. For example, the plates 610 and 612 could be of plastic for small drives used in some applications. The plates 610 and 612 could be made of metal for planetary gear transmissions used in a higher horsepower transmission applications. The carrier 600 includes a plurality of planet sheaves 230, 232 and 234 and the sun pulley 210 which are attached between the plates 610 and 612. Each of the planet sheaves 230, 232 and 234 comprise a spool of sufficiently strong and stiff material. Pressed or retained within the spool is a maintenance-free bearing. In this particular case, the maintenance-free bearing is a sealed ball bearing. Another possibility would be to use bushings made of a low friction or lubricated bearing material. Planet sheave 230 has a sealed bearing 630, planet sheave 232 has a sealed bearing 632 and planet sheave 234 has a sealed bearing 634. The sun pulley 210 is mounted on a shaft that rotates on two sealed bearings. One sealed bearing 640 is shown in FIG. 6. Fasteners are used to attach the planet sheaves 230, 232, 234 the plates 610 and 612 of the planet carrier. Spacers can be used on either side of the sealed bearings 630, 632 and 634, to create a clearance between the planet sheaves 630, 632, 634 and the plates 610 and 612 of the planet carrier 600. In the alternative, bosses or raised portions can be formed into the plate 610 and 612 in the area where the sealed bearings 630, 632 and 634 will contact the plates 610 and 612. These bosses can be used in lieu of the spacers.

As shown in both FIGS. 6 and 7, the sun pulley 210 has teeth positioned about its periphery or outside diameter. The teeth on the sun pulley 210 have a tooth profile which is determined by the belt 222 which is selected for use with the planetary belt transmission 130. The sun pulley 210 is attached to shaft 710. The sun pulley and the shaft 710 may be one integral part. The shaft 710 may be the driving shaft or the driven shaft depending on the application. The shaft 710 of the sun pulley 210 is not a part of the planet carrier 600. The planet carrier also includes a second shaft 720 which is attached to plate 612 of the planet carrier 600. Shafts 710 and 720 are collinear. As shown in FIG. 7 the shaft 720 includes an opening 730 therein. The opening 730 is a clearance opening for one end of shaft 710. Clearance opening 730 allows the shaft 710 to rotate with respect to plate 612 of the planet carrier 600. The shaft 710 rotates on a pair of sealed bearings 640 and 642. One sealed bearing is located on plate 612 and another sealed bearing 640 is located within plate 610 of the planet carrier 600. The bearings 640 and 642 are press fit and retained within their respective parts.

Figure 8:
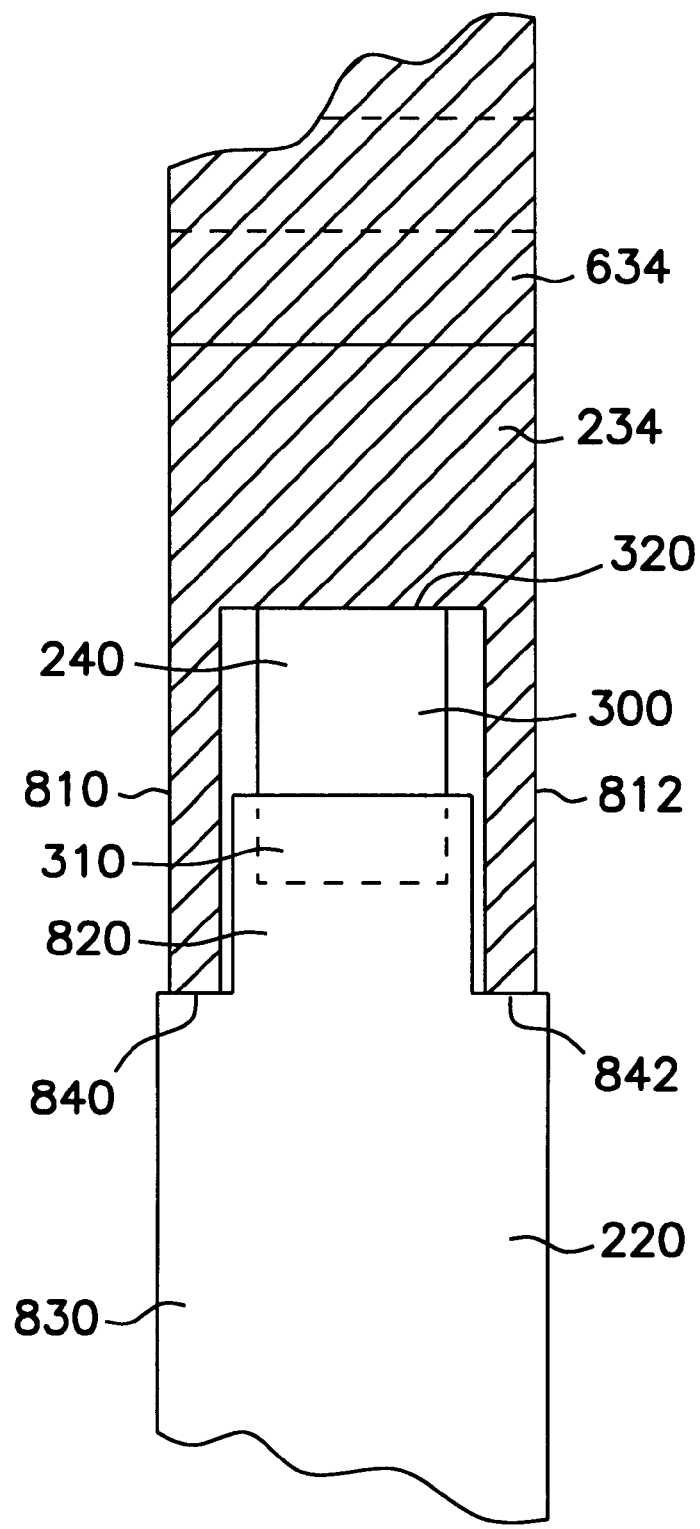
FIG. 8 is a cutaway view of a belt and planetary sheave engaged with the ring gear of the planetary belt transmission.

FIG. 8 is a cut away view of the planet and the ring pulley. FIG. 8 shows the planetary sheave 234 and the bearing 634 within the planetary sheave 234. Planetary sheave 234 is shaped like a spool in that it has two rims 810 and 812 which extend out beyond the main body of the planetary sheave 234. For the sake of simplicity, we have chosen belt 222 of the belt type 300. As can be seen, the flat side of the belt 320 rides over the center cylindrical spool portion of the planet sheave 234. The tooth side of the belt 310 engages the teeth on the ring pulley 220. The width of the ring pulley is greater at the outside diameter than at the teeth profile. Where the inside diameter 820 joins the outside diameter 830, a pair of shoulders 840 and 842 are formed on the ring pulley 220. In operation, the rim 810 of the planet sheave 234 rides on the shoulder 840 of the ring pulley 220. Rim 812 of the planet sheave 234 also rides on the shoulder 842 of the ring pulley 220. The rims 810 and 812 are used to position the planets in the axial direction with respect to the ring pulley 220, because in this particular case the planet carrier is not axially positioned. Axial positioning of the planets 230, 232, and 234 with respect to the ring pulley 220 can be achieved in many different ways. For example, a rim-like structure can be added to either the ring pulley 220 or the planet carrier 600. The axial position may also be fixed by fixing the various components in the axial direction onto their respective shafts. If the shafts do not move in an axial direction there is no need for a rim on the planet sheaves 230, 232, 234, on the planet carrier 600, or on the ring pulley 220.

As can be seen the transmission 130 is relatively inexpensive to build. Many of the parts of the planetary belt transmission on 130 are off the shelf. The off the shelf items include the belt 222, the sun pulley 210 and the sealed, maintenance free bearings 630, 632, 634 and 640. The fasteners are also standard and off the shelf. As a result, the planetary belt transmission 130 is inexpensive in terms of the parts used to form the planetary belt transmission 130. In addition, the manufacturing cost of the planetary belt transmission, when compared to a gear type planetary transmission, is also less. The manufacturing cost is less since alignment of all the parts is not as critical in the planetary belt transmission 130 as compared to the alignment of the parts in a planetary gear transmission. As mentioned previously, alignment of the gears in a planetary gear transmission is critical so that the sides of the teeth do not bear an undue or even the entire load. In addition, the parts of the planetary belt transmission 130 need not be machined as accurately in order to minimize frictional resistance and maintain an accurate angular relationship between the input and output shafts. Such machining is required in a planetary gear transmission. Machining of these gears is costly. Thus, the planetary belt transmission 130 is less expensive both in terms of the parts that go into the planetary belt transmission as well as the machining and assembly costs associated with a planetary gear type transmission.

Another advantage of the planetary belt transmission is that it is capable of a very high transmission ratio or mesh ratio when compared to a planetary gear transmission. In a planetary gear transmission, a gear ratio of 6:1 is the maximum possible. In the planetary belt transmission, the diameters of the planets, sun and ring do not have the same relation as for a planetary gear transmission. The planets do not mesh with the sun or ring. The belt is the component that transmits power between the sun 210 and ring 220. As a result, ratios can be as high as needed in the space available. Higher gear ratios are achievable by the planetary belt transmission than a comparably sized planetary gear transmission.

The planetary belt transmission 130 is not restricted by a planet size. The planet sheaves 230, 232 and 234 do not have to mesh with the sun pulley 210 and therefore a larger gear ratio is achievable. The only requirement is that the teeth on the sun pulley 210 and the teeth of the ring pulley 220 must be able to mesh with the teeth of the belt 222. The sheaves 230, 232 and 234 act as guides for the belt in the contact between the belt and the ring pulley 220. In other words, a small sun pulley 210 with a few teeth (as low as ten teeth) can be used with a relatively large ring pulley 220 with many teeth and so transmission ratios far greater than 6:1 are readily achievable. High transmission ratios provide for smaller and more compact transmissions. For example, a planetary belt transmission having a transmission ratio of 9:1 is easily achievable with the planetary belt transmission 130. A transmission that includes two planetary belt type transmissions 130 in a two-stage transmission would then have a reduction or increase in speed of 81:1. A gear type planetary transmission that could achieve 81:1 would require a minimum of three planetary gear type transmissions or stages. Three planetary gear transmissions require additional bearings, additional machining of all the gears and careful alignment of the whole assembly is critical. With additional bearings and gears, the efficiency of the gear box goes down since there is more loss due to friction in bearings and gears. In addition, three planetary gear transmissions also require more space than two of the planetary belt transmissions 130. As a consequence, using multiple planetary belt transmission 130 can result in a much more compact transmission.

The highest transmission ratios for speed reduction or speed increase that could be output from a planetary belt type transmission 130 have been discussed above. A planetary belt transmission 130 can also be used in different ways to produce different transmission ratios. The planetary belt transmission 130 can be used as a speed reducer or speed increaser in the same manner as a planetary gear transmission can be used as a speed reducer or speed increaser. The amount of speed reduction or speed increase is actually dependant on which element of the transmission is used as the driving member, which element of the transmission is used as the driven member, and which element is used as the stationary member. In the following configurations the transmission acts as a speed reduction:

1. The sun pulley is used as the driving member, the planet carrier as the driven member and the ring sheave is the stationary member.
2. The sun pulley is used as the driving member, the ring sheave is used as the driven member and the planet carrier is the stationary member.
3. The ring sheave is used as the driving member, the planet carrier is used as the driven member and the sun pulley is the stationary member.

In the following configurations the transmission acts a speed increaser:

1. The planet carrier is used as the driving member, the sun sheave as the driven member and the ring sheave is the stationary member.
2. The planet carrier is used as the driving member, the ring sheave is used as the driven member and the sun sheave is the stationary member.
3. The ring sheave is used as the driving member, the sun sheave is used as the driven member and the planet carrier is the stationary member.

As a result of these combinations the planetary belt transmission has six possible transmission ratios. In addition, the gear can be used as a reverser depending on which element is driven and which is stationary. For example, when the sun pulley 210 is rotated in one direction and the ring pulley 220 is held stationary, the planet carrier rotates in the same direction as the sun pulley. When the sun pulley 210 is rotated in the one direction and the planet carrier 600 is held stationary, the outer ring pulley 220 rotates in the opposite direction. This can be used for reverse in a lawn mower, yard equipment or for any device 100 that needs to include a reverse gear. This application needs a clutch incorporated in the design to switch between holding the planet carrier or the ring pulley stationary.

Another advantage of the planetary belt transmission is that no lubrication and maintenance is required. As mentioned above, the planetary belt transmission 130 can include or can be made with maintenance-free bearings and, therefore, requires no lubrication over the life of the transmission. A gear transmission by contrast, must be lubricated in order to provide a reasonably lengthy life. As mentioned in the background of the invention, there are many ways to lubricate such a transmission, however, the necessity of lubricating the transmission also restricts possible orientation of the transmission. The checking of the oil level and periodical changing of the oil requires maintenance. A device 100 equipped with a gear type transmission, can not be operated in an upside down orientation since the lubricant will not go to the splash pan as originally designed. This can be a disadvantage if it is desired to have a piece of equipment that can run in multiple orientations. The planetary belt transmission 130 can be run in virtually any orientation since a splash pan or outside lubrication is not required.

A planetary belt transmission 130 can also be designed to transmit large amounts of power, such as 100-200 horsepower, without slippage. The belt 222 is the component of the planetary belt transmission 130 which restricts the amount of power the transmission can transmit. There are belts available today that are capable of transmitting 200 horsepower. In addition, more than one belt may be used in a single stage.

An additional advantage of the planetary belt transmission 130 is that there is no backlash like there is in a planetary gear transmission. Standard gear transmissions require play between the gears. Backlash is the amount of rotation of the driving shaft required before the driven shaft starts to rotate after the direction of rotation of the driving shaft is reversed. When a gear, such as a ring pulley and a planet mesh, there must be some amount of clearance between the gear teeth. A planetary gear transmission has two locations where backlash occur; between the sun and planet gears and between planet gears and ring pulley. Therefore the backlash is twice the amount in some of the spur gear transmissions. With the planetary belt 130, the backlash is either eliminated or very small, since the teeth on the belt engage the teeth on the sun pulley or the ring pulley with no clearance. An additional advantage of the planetary belt transmission is that the wear of the gear teeth of the ring pulley and the sun pulley is very small compared to the wear of the teeth on the belt. Therefore the only wear part of the planetary belt transmission is the belt itself, which can be easily replaced.

Figure 9:
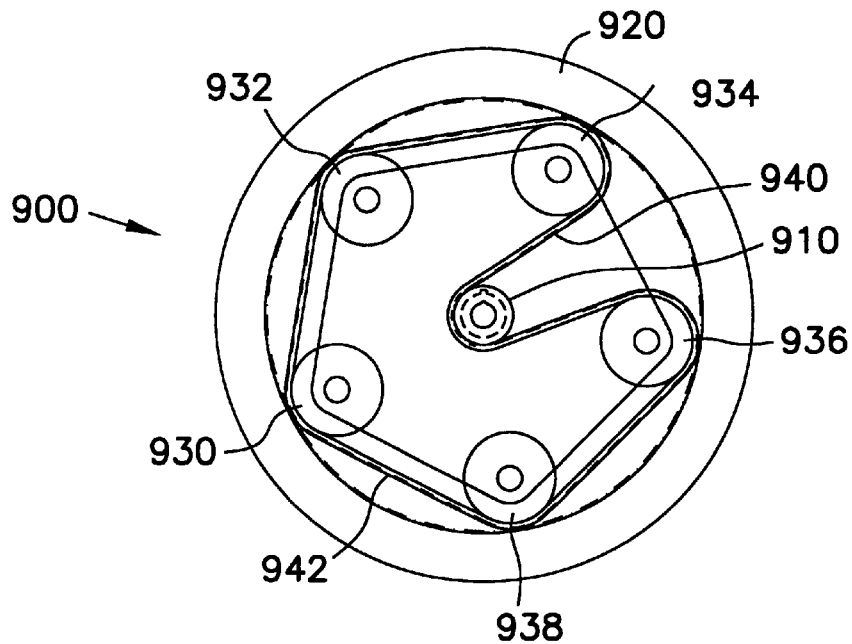
FIG. 9 is a cutaway front view of another preferred embodiment of the planetary belt transmission having five planetary sheaves.

FIG. 9 shows a cut away front view of another preferred embodiment of a planetary belt transmission 900. The planetary belt transmission 900 differs from the planetary belt transmission 130 in that the transmission includes five planetary sheaves, 930, 932, 934, 936 and 938. Each of the planetary sheaves 930, 932, 934, 936 and 938 are attached to a planetary carrier. The planetary carrier is not shown in FIG. 9 for the purposes of a clear illustration. The planetary belt transmission also includes a sun pulley 910 and a ring pulley 920. The teeth of the ring pulley 920 and the sun pulley 910 engage the tooth of a belt 940 the teeth of the belt are depicted by a pitch line 942 on the belt. The number of planetary sheaves which are used is not necessarily limited to three, as shown in FIG. 2, or five as shown in FIG. 9. For example, to transmit higher amounts of horsepower, more planetary sheaves may be used to distribute transmitted torque over more contacts between belt and ring pulley.

To transmit a higher horsepower, it may be necessary to increase mesh or gear ratio engaged between the belt 940 and the ring pulley 920 at any given amount of time. Larger planetary sheaves 930, 932, 934, 936 and 938 can be used to give the belt a larger radius of curvature so that more teeth engage the ring pulley 920 for a particular sheave. It should be noted that the planetary sheaves 930, 932, 934 and 936 are all mounted on maintenance-free bearings. The sun pulley 910 is also mounted on a pair of maintenance-free bearings. The belt 940 continues to follow a C-shape or U-shaped serpentine path, as it did with the planetary belt transmission 130.

Figure 10:
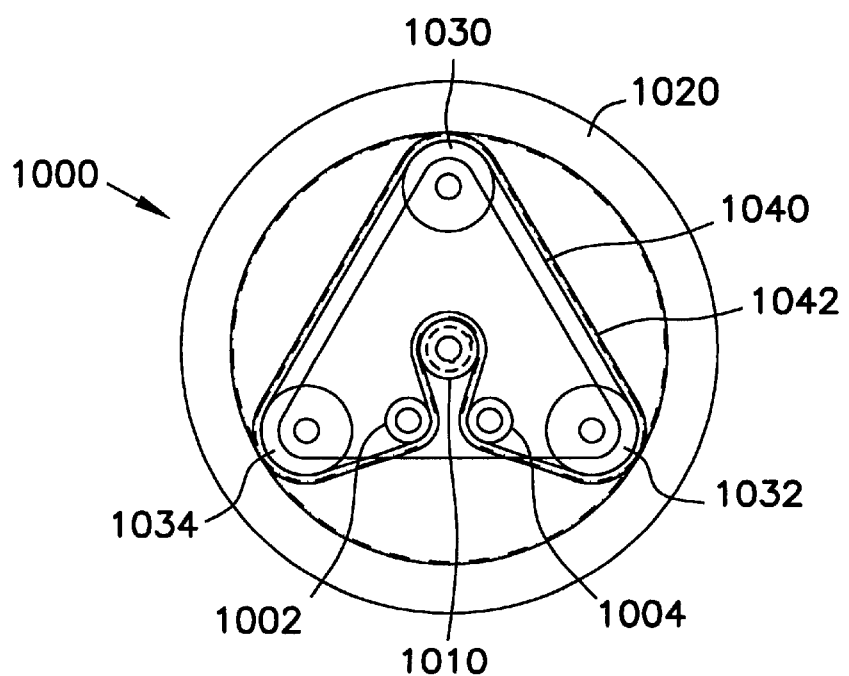
FIG. 10 is a cutaway front view of another preferred embodiment of the planetary belt transmission having a pair of idlers.

FIG. 10 is a cut away front view of another preferred embodiment of the planetary belt transmission 1000. In this particular planetary belt transmission 1000 differs from the planetary belt transmission 130 in that it includes a pair of idlers 1002 and 1004. The planetary belt transmission 1000 includes planetary sheaves 1030, 1032 and 1034. The planetary belt transmission 1000 also includes a sun pulley 1010 and a ring pulley 1020. The planetary belt transmission 1000 also includes a belt 1040 that has plurality of teeth as shown by the pitch line 1042. The pitch line 1042 also depicts which side of the belt is toothed. The opposite side of the belt 1040 flat. The idlers 1002 and 1004 serve two purposes. First of all the idlers 1002 and 1004 are used to make the belt 1040 wrap around a larger circumference of the sun pulley 1010 and engage more teeth of the belt 1040 with the teeth of the sun pulley. Thus the idlers can be used to distribute more of the power over more of the teeth of the sun pulley 1010. The idlers can also be made to be adjustable. When adjustable idlers are used, the gear ratio of the planetary gear transmission 1000 can be easily changed by changing a sun pulley 1010 which has more or less teeth than the present sun pulley. A smaller or larger sun pulley would require a larger or smaller belt 1040. However, with adjustable idlers 1002 and 1004 the newly sized sun pulley 1010 can be accommodated by repositioning the idlers to account for the different belt length that would be necessary. For example, if a smaller sun pulley 1010 was placed in the planetary belt transmission 1000 thereby increasing the transmission ratio available, the belt would be too long. The idlers 1002 and 1004 could be adjusted so that they are closer together and thereby take up the additional slack that would result from having a smaller sun pulley 1010. If the sun pulley 1010 was replaced with a larger sun pulley, thereby decreasing the present transmission ratio, the belt would not be long enough. Therefore idlers 1002 and 1004 would be moved farther apart to accommodate a larger sun pulley 1010. Of course, it should be remembered that when sun pulleys are replaced, the tooth profile of the sun pulley 1010 must be selected to mesh with the teeth of the belt 1040. The sun pulley 1010 is typically a standard part.

Figure 11:
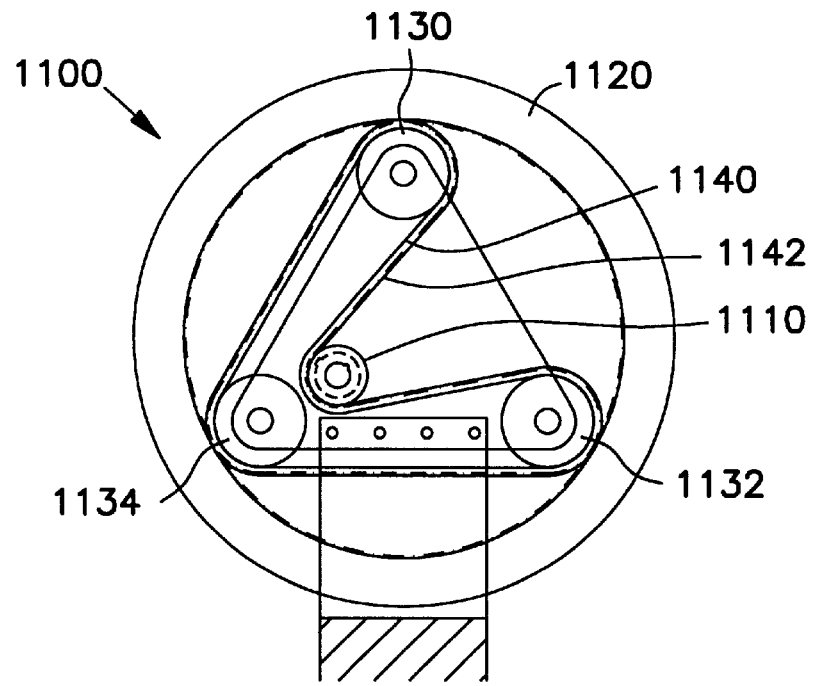
FIG. 11 is a cutaway front view of another preferred embodiment of the planetary belt transmission having an off center sun gear.

FIG. 11 is a cut away front view of yet another preferred embodiment of a planetary belt transmission 1100. In this particular planetary belt transmission 1100, the sun pulley 1110 is off center with respect to the planet carrier (not shown) in this particular preferred embodiment of the planetary belt transmission 1100, the planetary carrier would be held stationary. In other words, the axis of rotation of the sun member 1110 is parallel to the axis of rotation of the ring member 1120. The planetary belt transmission 1100 would be used in a transmission that had specific space restrictions that would require an off-center sun pulley 1110. The planetary belt transmission 1100 would include a ring pulley 1120 as well as planet sheaves 1130, 1132 and 1134. A belt 1140 would be wrapped around the sun pulley 1110 and the planetary sheaves 1130, 1132 and 1134 in a C-shaped configuration. The belt 1140 can also be thought of as wrapping around the sheaves and the sun pulley 1110 to form a polygon having one U-shaped side. The bottom of the U is wrapped around the sun pulley 1110. The toothed side of the belt 1142 would engage the teeth on the sun pulley 1110 as well as the teeth on the ring pulley 1120. As a result, the profile of the teeth on the belt would determine the profile the teeth on the sun pulley 1110 and the profile of the teeth on the ring pulley 1120.

Figure 12:
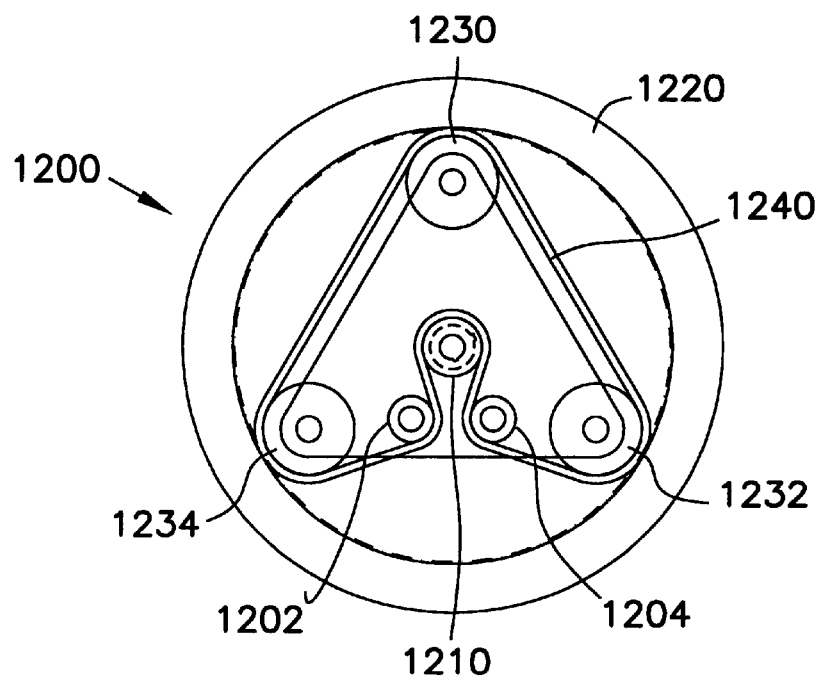
FIG. 12 is a cutaway front view of another preferred embodiment of the planetary belt transmission using a flat belt.
Figure 13:
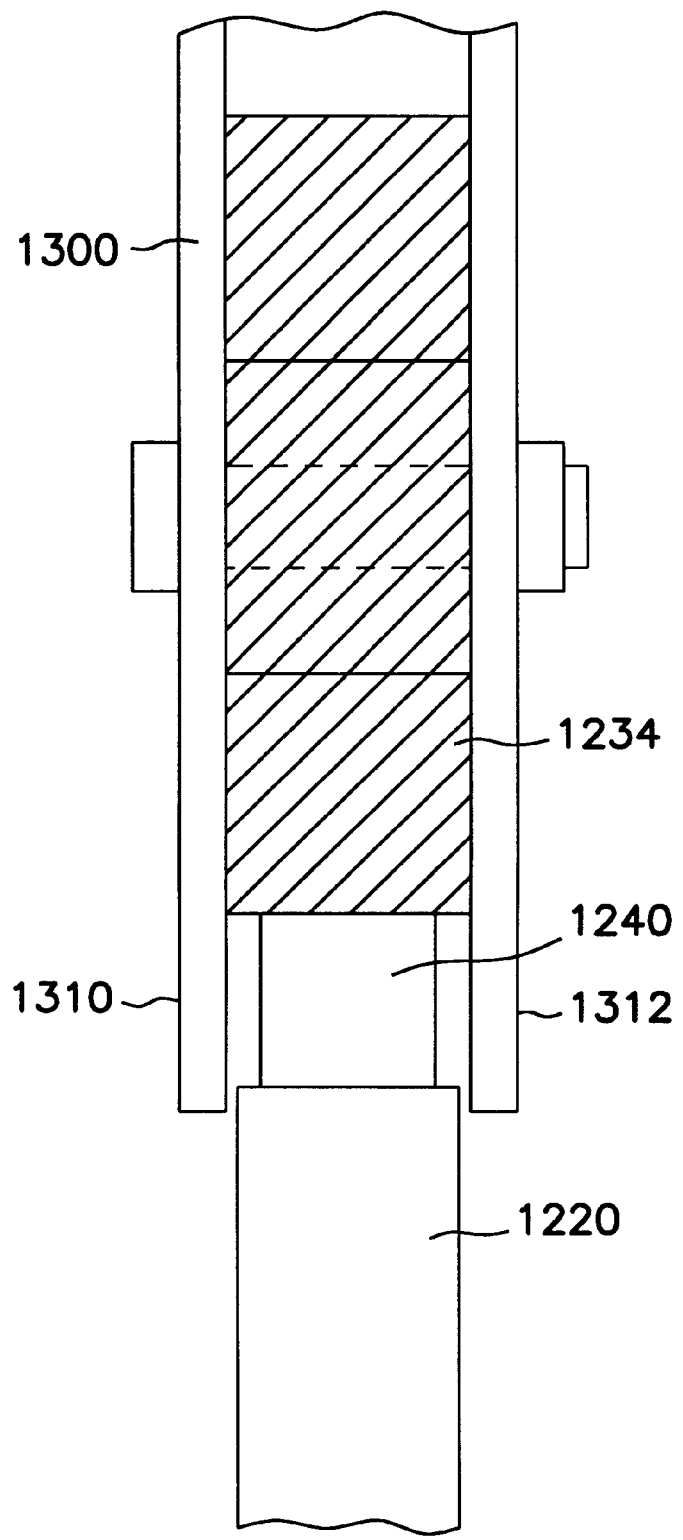
FIG. 13 is a cutaway view of a belt and planetary sheave engaged with the ring member of the planetary belt transmission illustrated in FIG. 12.

FIG. 12 is a cut away view of the planet and the ring member in which a flat belt is used in the planetary belt transmission 1200. The planetary belt transmission 1200 includes a first idler 1202, a second idler 1204, a sun member 1210, a ring member 1220, three planetary sheaves 1230, 1232, 1234, and a belt 1240. The belt 1240 is a flat belt. It should be understood that a toothed belt is not necessary but is used to prevent slippage between the belt and the various components. The belt 1240 is wrapped around the sun member 1210 and the planetary sheaves 1230, 1232, 1234 so that the belt 1240 forms a C-shape when wrapped around the sun member 1210 and the planetary sheaves 1230, 1232 and 1234. In this embodiment, the sun member, planet sheaves and ring member have no teeth. The planet sheaves 1230, 1232 and 1234 are held in position by a planet carrier 1300 which is shown in FIG. 13. The planet carrier is similar to the one shown in FIGS. 6, 7 and 8.

The planetary belt transmission 1200 is designed to minimize or prevent slippage of the flat belt 1240 with respect to the other components. To prevent or minimize slippage, the planet sheaves 1230, 1232, 1234 are positioned close to the ring member 1220 such that a force is placed onto the flat belt 1240 by the planet sheaves to produce a large friction force between the planet sheaves, the ring member and the belt passing therebetween. The amount of force placed on the belt can be adjusted to provide an appropriate amount of friction while minimizing wear. The flat belt 1240 is also tensioned so that an appropriate amount of friction is placed on the sun member 1210. The idlers 1202 and 1204 are used to adjust the tension on the belt 1240 as well as to make the flat belt 1240 wrap around more of the peripheral surface of the sun member 1210. When the friction between the belt 1240 and the components is sufficiently high, the slippage is minimized. The amount of friction must be balanced against wear on the belt 1240.

FIG. 13 is a cutaway view of a flat belt and one planetary sheave 1230 engaged with the ring pulley 1240 of the planetary belt transmission 1200. A rim must be provided on the planet sheave 1234, on the ring member 1220, or the planet carrier to guide the belt 1240. The distance between the planet sheave 1234 and the ring member 1220 is adjusted to place a force on the belt 1240. The friction force between the belt 1240 and the ring member 1220 and the sheave 1234 is proportional to the force that is normal to the portion of the surface where the belt engages the ring member 1220 and the sheave 1234. Any type of flat belt may be used including flat belts and v-belts.

The planetary carrier 1300 includes a pair of rims 1310 and 1312 which extend over the belt 1240. The rims 1310 and 1312 contain the belt 1240 and serve as a guide to keep the belt 1240 engaged between the ring member 1220 and the planetary sheave 1234.

Figure 14:
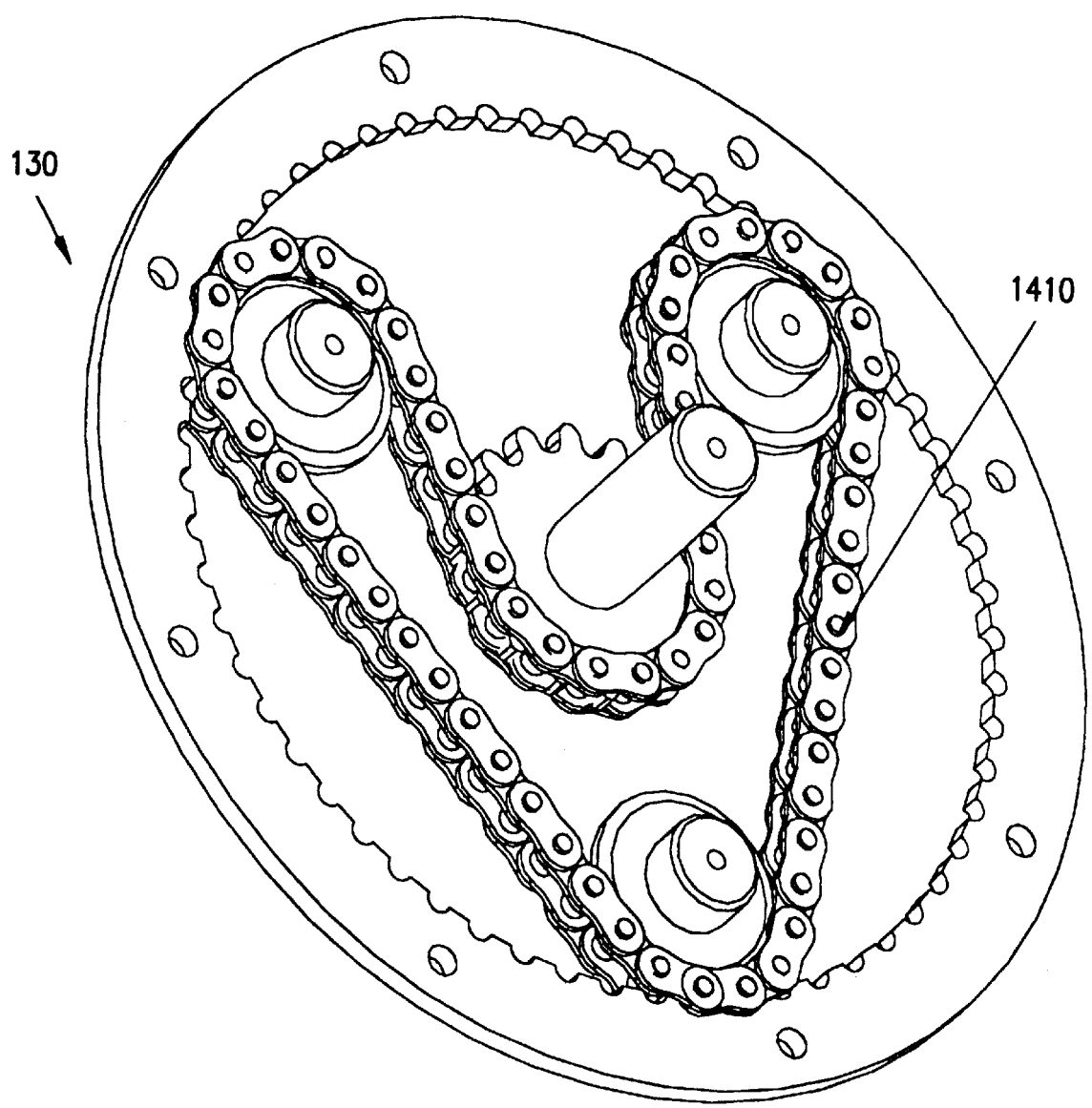
FIG. 14 is a perspective view of the planetary belt transmission using a roller chain.
Figure 15:
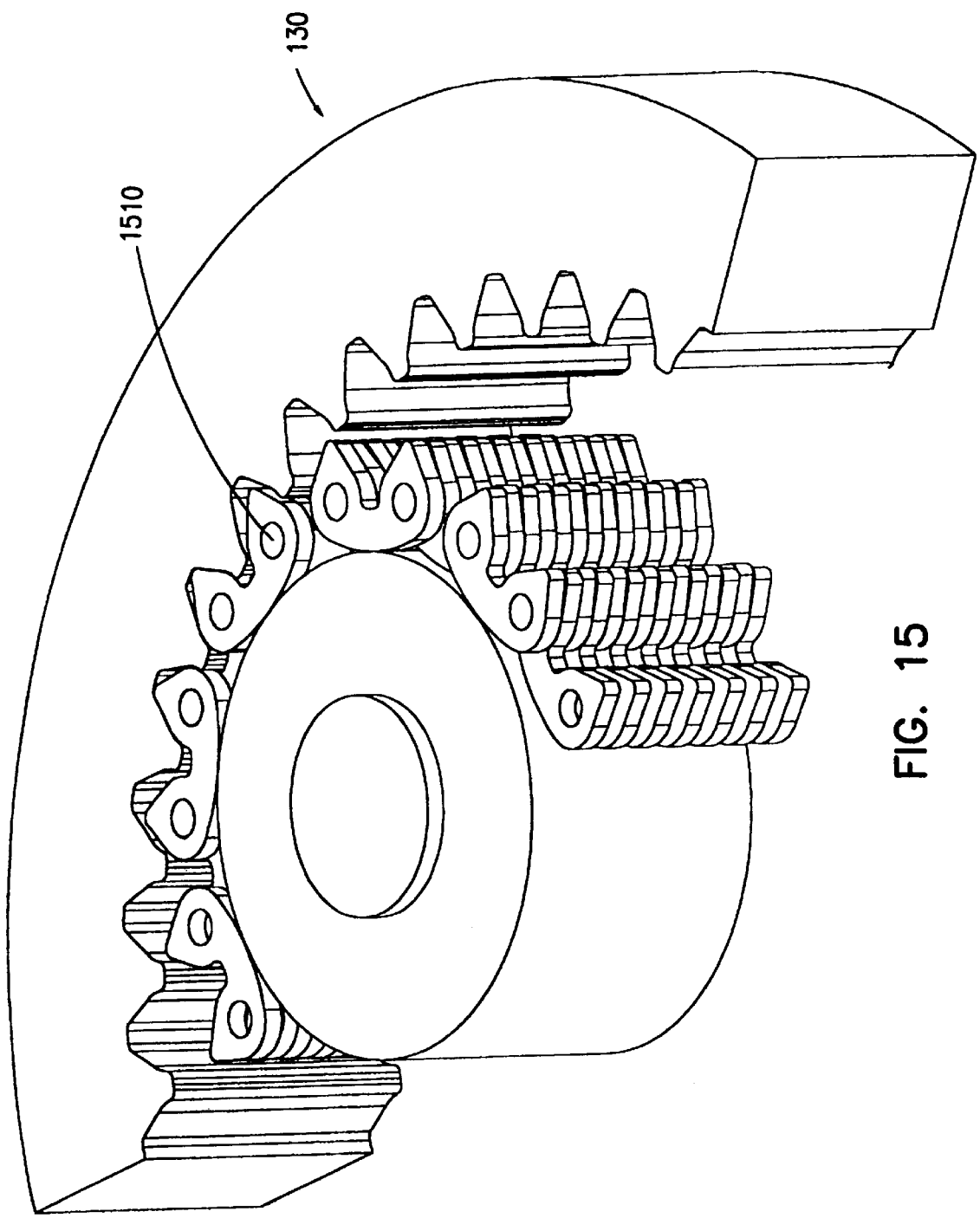
FIG. 15 is a perspective view of the planetary belt transmission using a link chain.

FIG. 14 is a perspective view of the planetary belt transmission 130 in which a roller chain 1410 is substituted for a belt. FIG. 15 is a perspective view of the planetary belt transmission 130 in which a link chain 1510 is substituted for a belt. It should be noted that many types of drive belts or chains can be used and still be within the scope of the described invention.

Figure 16:
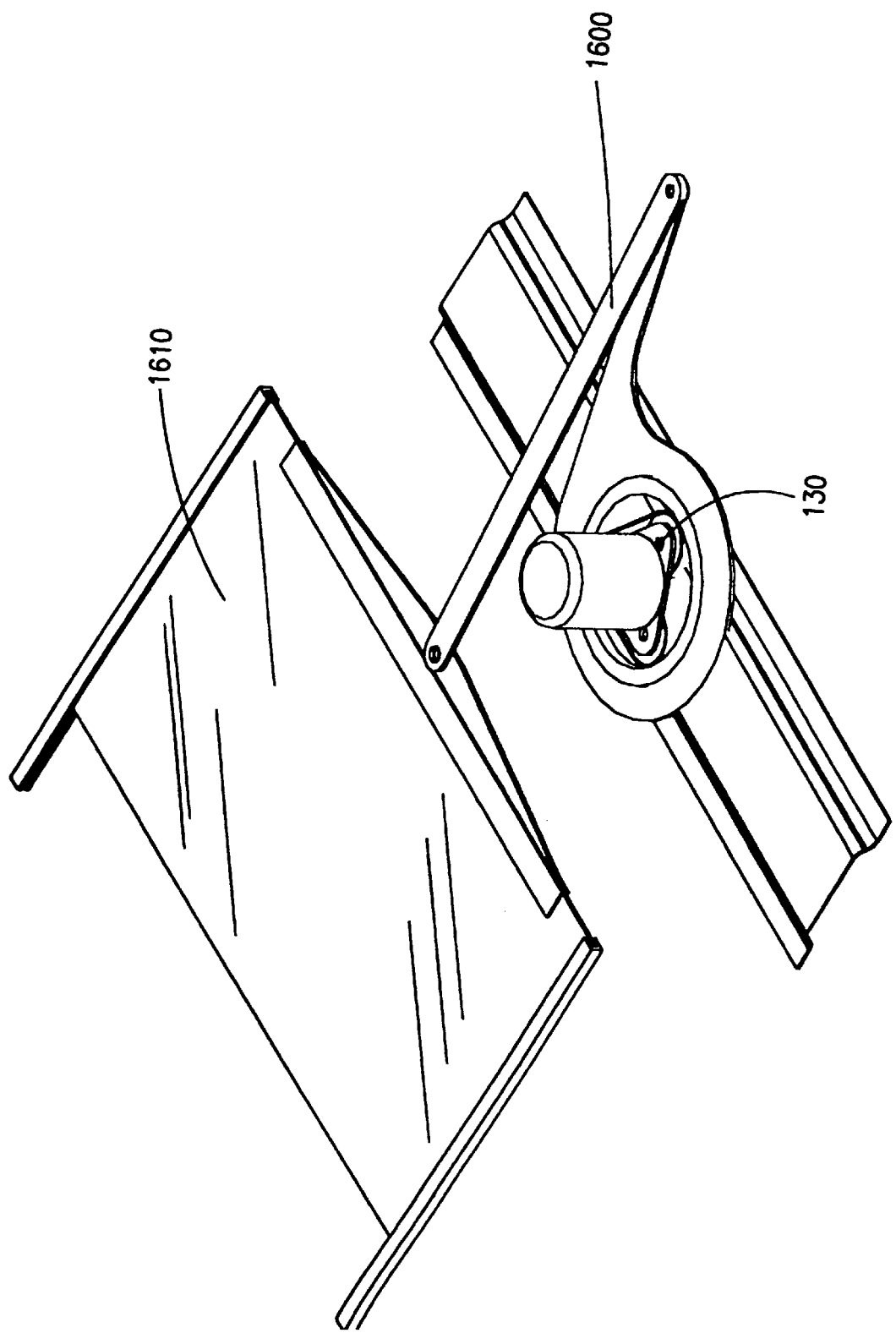
FIG. 16 is a perspective view of the planetary belt transmission attached to a window for an automobile.
Figure 17:
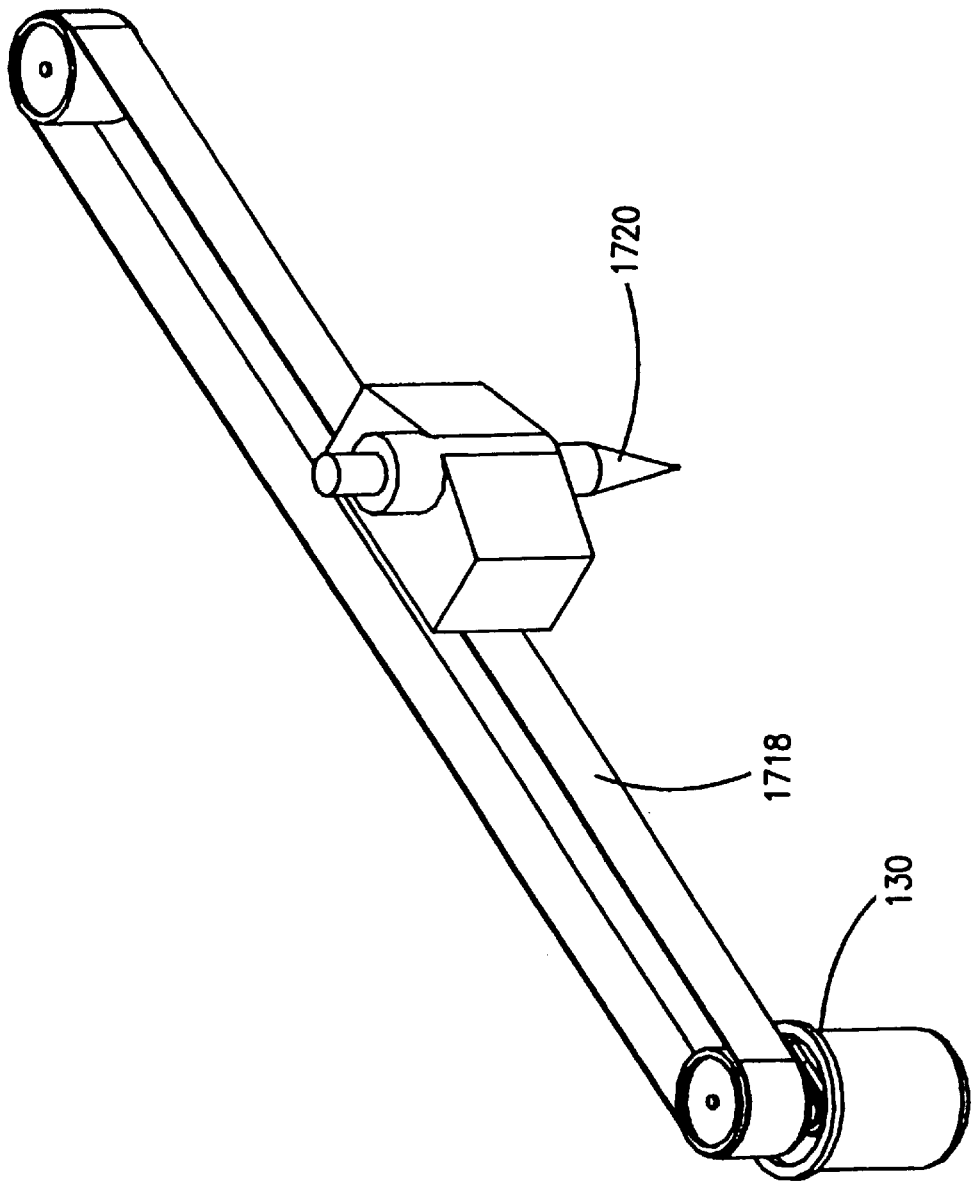
FIG. 17 is a perspective view of the planetary belt transmission attached to an X-Y plotter.
Figure 18:
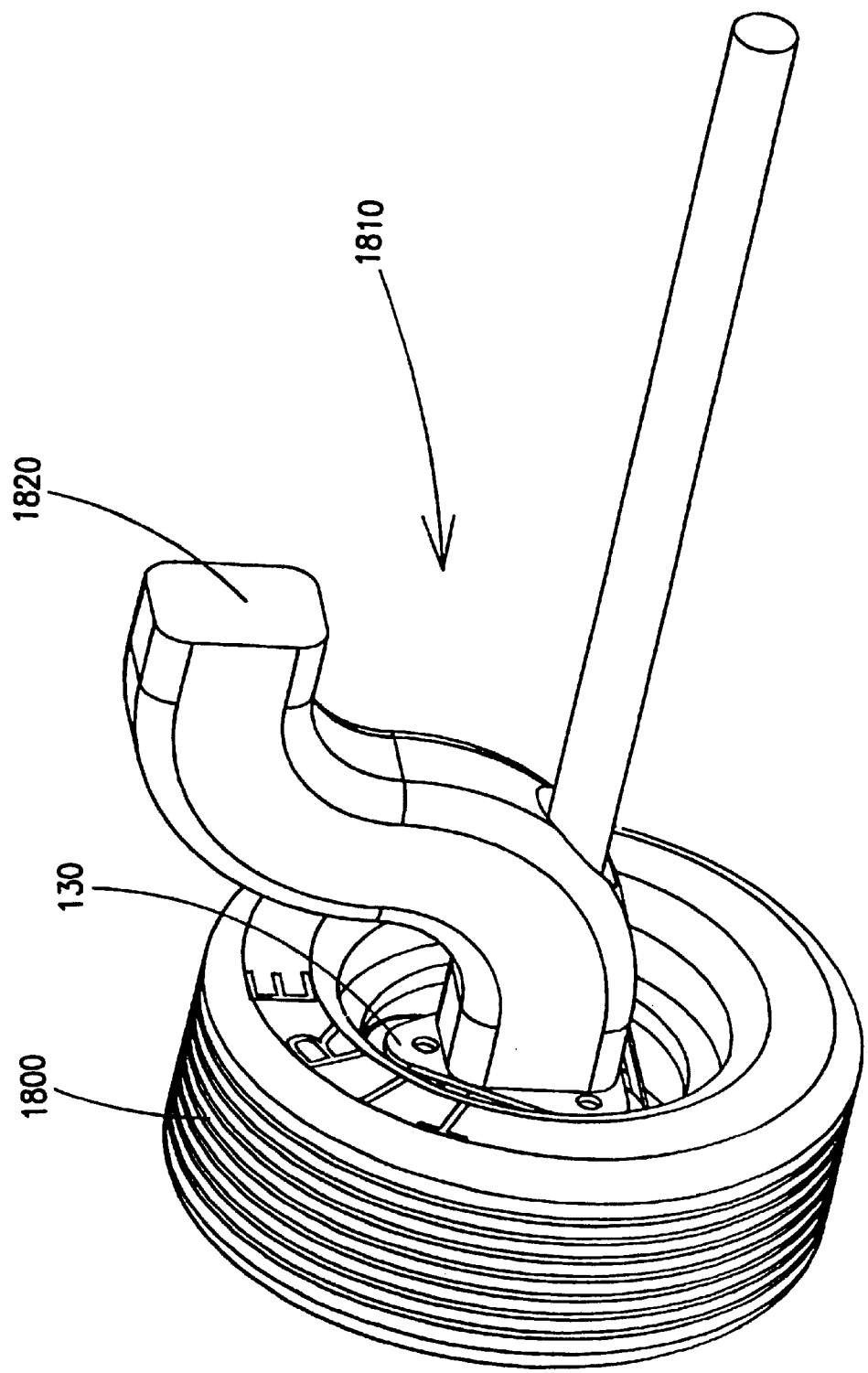
FIG. 18 is a perspective view of the planetary belt transmission as used drive a wheel in a lawn mower.
Figure 19:
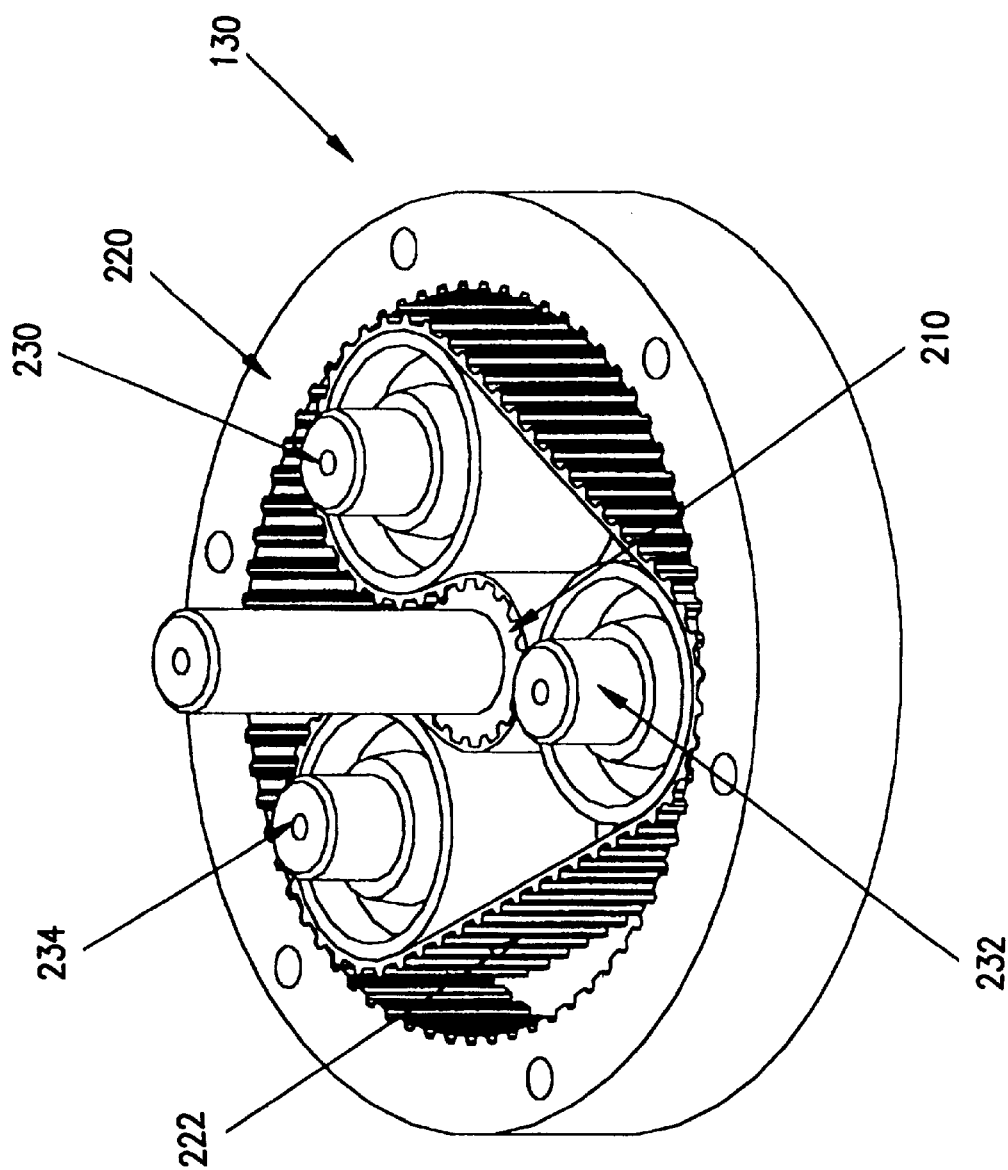
FIG. 19 is a perspective view of the planetary belt transmission.

The invention has many applications. As shown in FIG. 16, the planetary belt transmission 130 attached to a drive mechanism 1600 which links to a window 1610 for an automobile. FIG. 17 is a perspective view of the planetary belt transmission 130 used to drive a belt 1710 which in turn moves pen 1720 in an X-Y plotter. FIG. 18 is a perspective view a planetary belt transmission 130 as used to drive a wheel 1800 in a lawn mower 1810. The lawnmower is depicted as a axle connected to a frame 1820 of a riding type lawnmower. FIG. 19 is another perspective view of the planetary belt transmission 130.

The planetary belt transmissions described are very advantageous in that they require no lubrication and maintenance. The planetary belt transmission are also efficient, quiet, compact and inexpensive to build and manufacture. Off-the-shelf parts and maintenance-free bearings keep the cost of the transmission less than a comparable planetary gear transmission. The maintenance-free bearings also allow operation of the planetary belt transmission in most any orientation. In addition, since a belt is used there is zero or little backlash. The planetary belt transmission is also forgiving in both angular and axial alignment of the various components, which also reduces the cost of building a planetary belt transmission system when compared to building or manufacturing a planetary gear transmission. The planetary belt transmission is also light weight and small compared to a comparably sized planetary gear transmission. The power transmitted is dependent upon the rating of the belt used in the planetary belt transmission. The sun pulley can be changed in a planetary belt transmission to produce different output gear ratios between the sun pulley and the ring pulley. Idlers can be used to adjust the tension and accommodate different belt lengths in the planetary belt transmission. The end result is a transmission that has many of the benefits of a belt transmission plus many of the benefits of a planetary gear system. Especially, the planetary belt transmission is a belt transmission capable of having an input shaft and an output shaft which are collinear.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A transmission comprising:
    a ring pulley having a plurality of teeth which have a first tooth profile;
    a carrier positioned within the ring pulley, said carrier further comprising:
        a sun member rotatably attached to said carrier; and
        a plurality of planet sheaves attached to said carrier, said planet sheaves positioned around the sun member, wherein three of the planetary sheaves further comprise a first rim and a second rim, said first and second rims spaced apart at a distance such that a portion of the ring pulley fits between the first rim and the second rim, so that the ring pulley is positioned between said first rim and said second rim of at least some of the said plurality of planetary sheaves thereby limiting the axial motion of the carrier with respect to the ring pulley; and
    a belt engaging with the sun member, said plurality of planet sheaves and said ring pulley, said belt having a second tooth profile wherein the teeth of the belt mesh with the teeth of the ring pulley.

2. A transmission comprising:
    a ring pulley having a plurality of teeth which have a first tooth profile;
    a carrier positioned within the ring pulley, said carrier further comprising:
        a sun member rotatable attached to said carrier; and
        a plurality of planet sheaves attached to said carrier, said planet sheaves positioned around the sun member, wherein the planet carrier further comprises a first rim and a second rim, said first and second rims spaced apart at a distance such that a portion of the ring pulley fits between the first rim and the second rim; and
    a belt engaging with the sun member, said plurality of planet sheaves and said ring pulley, said belt having a second tooth profile wherein the teeth of the belt mesh with the teeth of the ring pulley.

3. A ring pulley for a planetary type transmission for use with a toothed belt, said ring pulley comprising a ring of material further comprising:
    an inside diameter, said inside diameter including teeth therein having a tooth profile determined by the tooth profile of the belt used in the planetary type transmission; and
    an outside diameter wherein the outside diameter of the ring pulley includes a shoulder having a thickness greater than the thickness of the inner diameter, said ring pulley having a first step and a second step between the inner diameter and outer diameter of the ring pulley.

4. An apparatus comprising:
    a window moving mechanism for an automobile including:
        a driving member;
        a driven member; and
        a transmission between the driving member and a driven member, said transmission further comprising:
            a ring pulley having a plurality of teeth which have a first tooth profile;
            a carrier positioned within the ring pulley, said carrier further comprising:
                a sun member rotatably attached to said carrier;
                a plurality of planet sheaves attached to said carrier, said planet sheaves positioned around the sun member; and
                a belt in communication with the sun member, said plurality of planet sheaves and said ring pulley, said belt having a second tooth profile wherein the teeth of the belt intermesh with the teeth of the ring pulley.

* * * * *

UNITED STATES PATENT AND TRADEMARK OFFICE
CERTIFICATE OF CORRECTION

PATENT NO.: 5,954,611

DATED: September 21, 1999

INVENTOR(S): Mills et al.

It is certified that error appears in the above-identified patent and that said Letters Patent is hereby corrected as shown below:

In the Assignee, delete "DaVinci Technology Corporation, Long Lake, Minn.", therefore.

There is no Assignee.

Signed and Sealed this

First Day of May, 2001

*Attest:*

NICHOLAS P. GODICI

*Attesting Officer*   Acting Director of the United States Patent and Trademark Office